United States Patent Office 2,844,484
Patented July 22, 1958

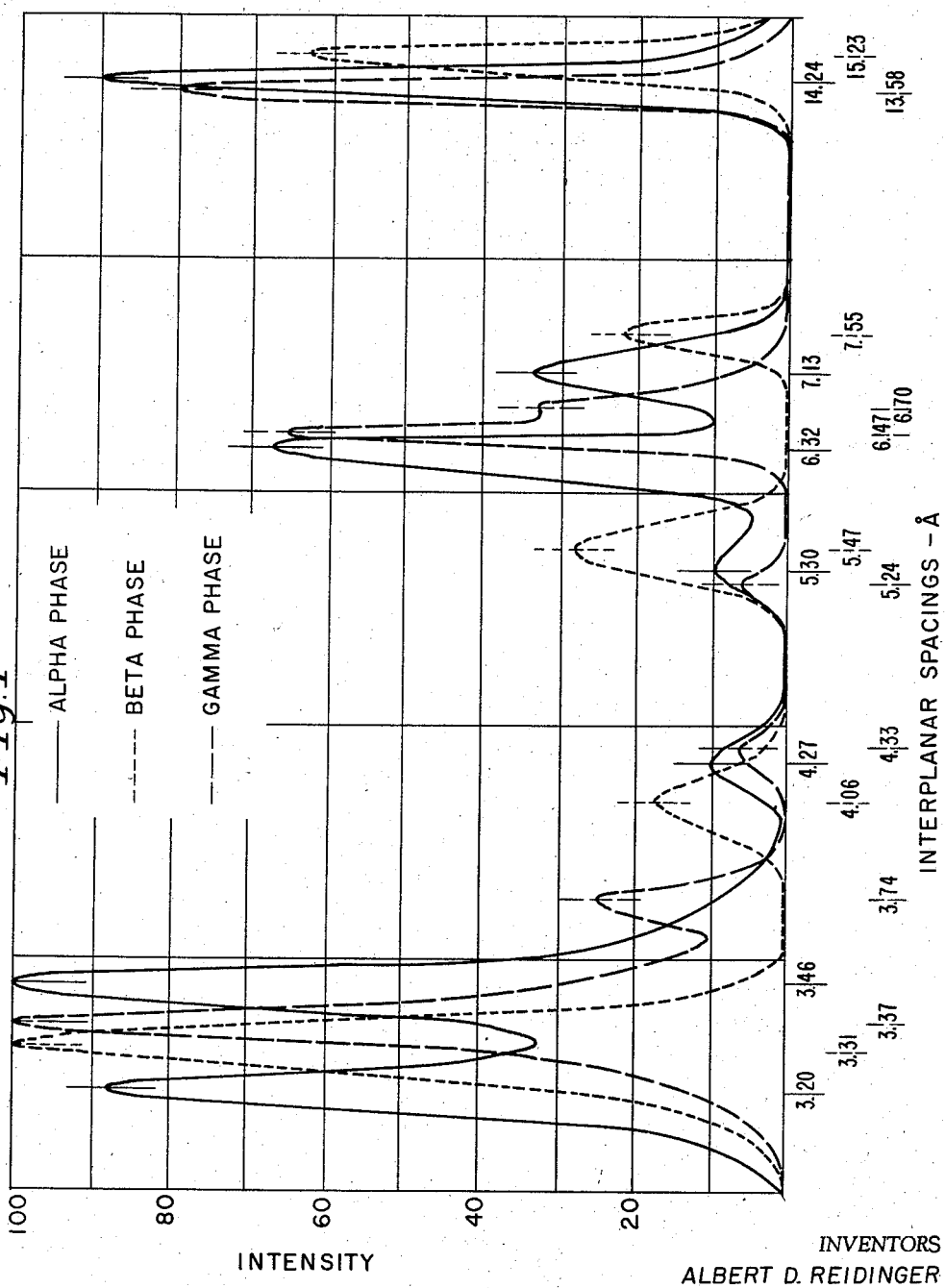

2,844,484
ORGANIC PIGMENTS

Albert D. Reidinger, Wilmington, Del., and William S. Struve, Chatham, N. J., assignors to E. I. du Pont de Nemours and Company, Wilmington, Del., a corporation of Delaware Application July 22, 1955, Serial No. 523,699

4 Claims. (Cl. 106—288)

This invention pertains to quinacridone pigments.

While red pigments have been known and used for many years, there has existed a long felt need in the coating composition field for a non-bleeding red color which possesses satisfactory tinctorial strength and light-fastness as well as superior outdoor durability with respect to gloss, film integrity and bronzing. Moreover, this need has become more acute in recent years as a result of the wide acceptance of red color shades, particularly in automotive finishes.

It has now been found that linear quinacridone which is represented by the following structural formula

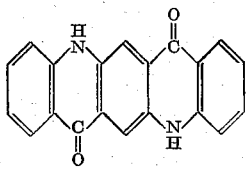

may be produced as pigments in a number of crystal phases with each phase exhibiting a different and heretofore unknown X-ray diffraction pattern. The present invention is concerned with the alpha crystal phase as distinguished from the beta and gamma crystal phases which are the respective subject matter of concurrently filed applications, Serial Nos. 523,754 and 523,755. Methods of producing quinacridone are disclosed in concurrently filed application Serial No. 523,922.

It is an object of this invention to provide a novel alpha crystal phase quinacridone pigment of intense red color and small particle size with consequent high tinting strength. It is also an object of this invention to produce color lakes from this pigment. It is a further object of this invention to provide a novel process for producing alpha crystal phase quinacridone in small particle size without danger of an undesirable phase or color change occurring during the process. It is a still further object to provide a process for obtaining alpha crystal phase quinacridone pigment in small particle size from quinacridones which are all or partly in a crystal phase other than the alpha phase.

The objects of this invention are accomplished by milling quinacridone in any crystal phase, or in a mixture of crystal phases, with a relatively large amount of salt until a sample of the pigment separated from the salt has a surface area greater than about 60 square meters per gram (as measured by the nitrogen absorption method of Emmet described in "Advances in Colloid Science," vol. 1, 1942). The salt is then extracted with a dilute aqueous acid leaving the quinacridone in a pure alpha crystal phase possessing suitable pigmentary properties. A particularly important and unique feature of the process is that regardless of the crystal phase of the quinacridone used as the starting material, the process converts the material to a pure alpha crystal phase.

The obtaining of an alpha crystal quinacridone end product having a surface area of above about 60 square meters per gram is critical to the use of the quinacridone as a pigment, since a surface area of less than 60 will not produce satisfactory results. Experience has shown that materials of this type with specific surface measurements significantly below about 60 square meters per gram have been of such low tinctorial strength as to have little commercial interest.

The accompanying Figure 1 shows the X-ray diffraction patterns of the alpha, beta, and gamma crystal phases of quinacridone with the intensities adjusted so that the most intense band of each pattern is assigned a value of 100 and the patterns superimposed in one drawing. These X-ray patterns were obtained by the well-known powder technique using a Geiger counter to record the intensity of the diffracted rays. The instrument actually records the intensity of the diffracted ray on the vertical axis versus the angle of diffraction on the horizontal axis with CuK alpha radiation, and then this angle is converted to interplanar spacings expressed in Angstrom units. The values given are accurate to within 2%, and in most cases, variation is less than 1%. Therefore, cognizance should be taken of this variance when interpreting the specification and the claims. It is obvious that these patterns have certain similarities and this is natural because of the chemical identity of the phases. Nevertheless, there are characteristic differences.

The alpha phase in small particle size is characterized by two intense lines quite close together with interplanar spacings of 3.46 A. and 3.19 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. In hue, this product is a bluish red pigment of excellent strength and intensity. This phase is the easiest of the three phases to obtain.

The beta phase is characterized by five well-defined lines corresponding to interplanar spacings of 15.23 A., 7.55 A., 5.47 A., 4.06 A. and 3.31 A. The lines with interplanar spacings of 15.23 A. and 3.31 A. are characteristically much stronger than the other three. This product is a violet pigment of excellent intensity and strength, exhibiting a high degree of resistance to change under various conditions. It is a valuable pigment in its own right and also as a blending agent for use with blue pigments to obtain reddish blues.

The gamma phase is characterized by three strong lines with interplanar spacings of 13.58 A., 6.41 A., and 3.37 A. and three relatively weak lines have interplanar spacings of 5.24 A., 4.33 A. and 3.74 A. This product is a bluish red pigment of excellent strength and intensity and of outstanding resistance to change either on exposure to the elements, to solvents or to chemical reagents.

The following examples are illustrative of the invention, but not in limitation thereof.

*Example 1*

6,13-dihydro-quinacridone is prepared by heating diethyl 2,5-dianilino-3,6-dihydro-terephthalate in an atmosphere of nitrogen at 250–257° C. for one hour in 4 times its weight of a mixture comprising 23.5% biphenyl and 76.5% diphenyl oxide. The dihydro-quinacridone obtained is separated by filtering and then washed with ethyl alcohol. 100 parts of the 6,13-dihydro-quinacridone and 600 parts of water are then charged to a suitable agitated vessel equipped with a reflux condenser. 560 parts of ethylene glycol is then added, followed in turn by 40 parts of sodium hydroxide (133 parts of a 30% solution) and 75 parts of nitrobenzene-m-sodium sulfonate. The mixture is heated to reflux (108° C.) while stirring and maintained at reflux temperature for about 2 hours. It is then diluted with an equal volume of cold water, filtered, washed free of alkali and dried to give 97 parts of quinacridone.

A ball mill of about 60 gallons total volume is charged with 1000 lbs. of "Cyl Pebs" (cylindrical bars of iron about ½" in diameter and about 1" long) together with 100 lbs. of common nails (20d size). 52 lbs. of dry sodium chloride is then added and finally 6 lbs. of the quinacridone. The mill is rotated at about 70% of critical speed (the critical speed is that speed at which the mill charge is just carried around the periphery of the mill instead of cascading over the surface of the charge) for about 15 hours. The dry powder is then discharged from the mill leaving the "Cyl Pebs" and nails behind. It is then wet up with a small amount of water, made up to a volume of about 50 gallons and about 20 lbs. of sulfuric acid (100%) is added to give an acid solution of about 5% concentration. The slurry is heated to the boil and boiled for about ½ hour, then filtered, washed free of acid and sulfate ion and held in the form of an aqueous paste.

A portion of this paste was dried out without special treatment to give a dry pigment which exhibited the typical X-ray diffraction pattern of the alpha phase.

A second portion of the paste was slurried in methanol, filtered and washed free of water with methanol and then washed free of methanol with xylene, and finally dried free of xylene. The resulting intense red powder exhibited the typical X-ray diffraction pattern of the alpha phase and shows a surface area of about 68 square meters per gram when tested by the Emmett nitrogen absorption method. When tested as a pigment in a coating composition, it is an intense bluish red of good tinctorial strength, free of any tendency to bleed in water, most organic solvents or in chemical agents, such as dilute acids and alkalies. These compositions also show excellent resistance to the elements. Thus, a printing ink extended 1:100 with zinc oxide shows no appreciable fade after 400 hours in a Fadeometer. Furthermore, enamels and lacquers formulated from this pigment have been exposed for 12 months in Florida with excellent gloss retention, no appreciable fading and no evidence of disintegration of the film.

*Example 2*

6,13-dihydro-quinacridone is prepared by heating diethyl 2,5-dianilino-3,6-dihydro-terephthalate in an atmosphere of nitrogen at 250–257° C. for one hour in 4 times its weight of a mixture comprising 23.5% biphenyl and 76.5% diphenyl oxide. The dihydro-quinacridone obtained is separated by filtering and then washed with ethyl alcohol. 10 parts of the 6,13-dihydro-quinacridone and 25 parts of water are then charged to a suitable vessel equipped with an agitator and a reflux condenser. 200 parts of ethyl alcohol is then added, followed in turn by 4 parts of sodium hydroxide (as a 20% solution) and 20 parts of nitrobenzene-m-sodium sulfonate. The mixture is heated to reflux while stirring and maintained at reflux temperature for about 2 hours. After cooling the product is filtered off, washed free of alkali and dried to give 9.6 parts of quinacridone. 20 parts of this quinacridone with 20 parts of anhydrous aluminum chloride and 160 parts dry toluene are charged to a flask of such dimensions that it will be slightly less than half full. This flask is protected from atmospheric moisture with a suitable dying tube. After stirring for about 6 hours, 0.6 part of stearic acid is heated. The mixture is stirred for a short time and then poured into about 2000 parts cold water. 25 parts of caustic soda is then added to the slurry and the toluene is removed by steam distillation. After this, the pigment is isolated by filtration, washed free of alkali, reslurried in a 4.5% solution of sulfuric acid and boiled for ½ hour. The pigment is recovered by filtering, and it is washed free of soluble salts and dried at about 60° C. The resulting powder is a strong quinacridone pigment in the alpha crystal phase. Orthodichlorobenzene and ethylene chloride have been successfully used instead of toluene in this procedure.

*Example 3*

2600 parts of the alpha phase quinacridone paste from Example 1 (500 parts dry quinacridone) is slurried with water to make a total volume equivalent to about 3000 parts and the temperature is adjusted to about 50° C. In a separate container, 200 parts of hydrogenated rosin is dissolved in a solution of 27 parts sodium hydroxide in 1500 parts of water at the boil, and this solution is added to the quinacridone suspension and stirred well. The rosin is then precipitated by adding a solution of 65 parts calcium chloride in 1000 parts of water and the slurry is stirred for 30 minutes while keeping the temperature at 50–60° C. It is then filtered, washed free of soluble salts and dried to give about 710 parts of a brilliant red pigment containing about 70% quinacridone and 30% of the calcium salt of hydrogenated rosin. It is very easily dispersed in the usual vehicles of the various coating compositions as well as in rubber, linoleum and the various plastics; it has all the durability characteristics of the undiluted pigment, and in addition, it exhibits a relatively higher color strength in proportion to the colored pigment present.

The presence or absence of certain types of solvents during the particle size reduction, or immediately thereafter, profoundly influences the phase resulting. To obtain the pure alpha phase, the particle size reduction is done in the absence of organic solvents, such as xylene and dimethyl formamide. However, such solvents as acetone and isopropanol would not alter the phase. The preferred weight ratio of pigment to salt (1:9) is not critical. As little as 4 parts of salt may be used, and amounts much in excess of the preferred 9 parts are operable. Larger amounts offer no advantage but can be used without harm.

The type of mill and the grinding aid used are conventional. Any mill which grinds by attrition and shearing is suitable; e. g., a ball mill, roller mill or edgerunner mill. The ball mill is the preferred apparatus. As for the quantity of grinding elements (balls, "Cyl Pebs," etc.) we have chosen, in the above examples, ratios by weight with respect to total material being ground, corresponding to preferred general practice in the ball-milling art. However, departure from these ratios will not affect our process seriously, provided that the time of grinding is correspondingly adjusted, as is well known in the grinding art. The use of nails as shown in Example 1 is optional, and they serve to break up any cake which may form on the walls of the mill if the ingredients charged are not perfectly dry.

The time of milling required for optimum results will vary with dimensions of the ball mill used. Thus, in a one-quart jar it requires 2 days or more to obtain results comparable to 15 hours in a 60-gallon mill. The optimum time is not critical and can be easily determined by any skilled person by simple experimentation.

The type of salt used in this process may also be varied. Sodium chloride is preferred because of low cost and ready availability, but other salts soluble in water or dilute acid or alkali such as potassium chloride, anhydrous sodium sulfate, ammonium chloride, ammonium sulfate, and calcium carbonate may be used with equally good results. Powdered commercial grades of these salts are most conveniently used. The extraction after ball-milling is necessary to remove the salt used as the grinding aid, and the presence of acid insures the removal of any particles of metal which may be abraded from the mill or the grinding balls.

As an alternative method for preparing alpha crystal phase quinacridone, one may dissolve a crude quinacridone in sulfuric acid and then precipitate the alpha crystal phase in small particle size by diluting the acid solution with water. The following example is illustrative of this aspect of the invention.

Example 4

100 parts of crude quinacridone, prepared by the process described in the first paragraph of Example 1, is added to 1000 parts of 96% sulfuric acid at about 10° C. The mixture is stirred while keeping the temperature below about 15° C. until the quinacridone was completely in solution. This solution is then added slowly to an agitated vessel containing about 20,000 parts of ice and water and the temperature kept below about 5° C. with addition of more ice if necessary. After the addition of the acid solution is complete, the bright red slurry is heated to the boil and boiled for ½ hour, cooled slightly, filtered and washed free of acid. The resulting paste has substantially the same properties as the finished product from Example 1.

In this process, the concentrated sulfuric acid must be of such a strength that the quinacridone is all taken into solution. 10 parts of 96% $H_2SO_4$ per part of quinacridone suffices well for this operation, though neither the amount nor the concentration are especially critical and may be varied appreciably. On the other hand, if the concentration or the temperatures are too high, it may results in sulfonation of the quinacridone with consequent alkali solubility. To this end, the temperature must be kept below about 15° C. and preferably below about 5° C. Precipitation of the pigment in the desirable small particle size is favored by drowning the acid solution in a large amount of cold water, but the conditions for this operation are not critical. Isolation of the pigment as a paste from the resulting slurry is entirely conventional.

It is preferred not to directly dry the aqueous paste of the alpha crystal phase quinacridone, since experience has shown that the product frequently dries to a very hard horny mass. Therefore, it is suggested that the wet material be transferred directly to a vehicle to give compositions of high strength. This procedure is well known, and it is referred to in the art as "flushing." Alternatively, the paste may be given special texture treatments, of which the methanol-xylene wash of Example 1 is illustrative. Finally, this product may be obtained in a highly useful form by converting it to a rosinated lake as shown in Example 3. The lakes may contain 50 to 80% color by weight and a preferred amount is 70%. Such rosinate lakes may be made from various grades of rosin dissolved in any convenient alkali and precipitated with an alkaline earth or a heavy metal salt. Barium, calcium, magnesium aluminum and zinc salts are suitable for forming the insoluble rosinate. Hydrogenated rosin is especially suitable for forming the lakes because of its relative purity and light color; furthermore, it is a saturated molecule, and there is no problem of spontaneous oxidation and consequent fire hazard. With hydrogenated rosin, calcium is the preferred precipitant because it gives a solid precipitate in contrast to some metals which give soft oily precipitates. The particular salt of calcium used is dictated by economy and availability. Thus, calcium nitrate or calcium acetate would be equally effective.

Quinacridone pigments serve a special need in the coating composition field. They are comparable in color to many of the well-known azo pigments, such as the calcium salt of the azo dye 2-chloro-4-amino-toluene-5-sulfonic acid→beta hydroxy naphthoic acid. However, these prior art pigments leave much to be desired in lightfastness, and they show a distinct tendency to bleed in aqueous systems, particularly in alkalies. In contrast, quinacridone reds show no significant change in a Fadeometer test after 400 hours, either in full shade or in a highly extended tint. They are absolutely non-bleeding in aqueous systems, either acid or alkaline, and non-bleeding in oils. Outdoor exposures for 12 months in Florida confirm their superior durability with respect to gloss, change in color, film integrity and bronzing. Since these excellent properties are accompanied by acceptable tinctorial strength, these new pigments answer a long felt need for improved red pigments. Most of these properties are common to all three phases; the most marked difference being in the color of the products. The alpha phase is a very intense red of a hue that has special utility for outdoor posters to give flesh tints, for some shades of automotive finishes, for pastel pinks in decorator's tints, and for linoleum, rubber and the like.

We claim:

1. As a new red pigment, linear quinacridone in alpha crystal phase characterized by an X-ray diffraction pattern showing two closely related strong lines with interplanar spacings of 3.46 A. and 3.19 A., a third line of similar intensity with an interplanar spacing of 14.24 A., two lines of moderate intensity with interplanar spacings of 6.32 A. and 7.13 A. and two weak lines with interplanar spacings of 5.30 A. and 4.27 A., said alpha crystal phase quinacridone having a surface area of at least 60 square meters per gram.

2. A process for preparing an alpha crystal phase linear quinacridone pigment characterized by an X-ray diffraction pattern showing two closely related strong lines with interplanar spacings of 3.46 A. and 3.19 A., a third line of similar intensity with an interplanar spacing of 14.24 A., two lines of moderate intensity with interplanar spacings of 6.32 A. and 7.13 A. and two weak lines with interplanar spacings of 5.30 A. and 4.27 A., which comprises dry milling linear quinacridone with an inorganic salt until the alpha crystal phase is obtained, and until the surface area of the quinacridone is at least 60 square meters per gram.

3. A process for producing an alpha crystal phase linear quinacridone pigment characterized by an X-ray diffraction pattern showing two closely related strong lines with interplanar spacings of 3.46 A. and 3.19 A., a third line of similar intensity with an interplanar spacing of 14.24 A., two lines of moderate intensity with interplanar spacings of 6.32 A. and 7.13 A. and two weak lines with interplanar spacings of 5.30 A. and 4.27 A., which comprises dry milling linear quinacridone with a water-soluble inorganic salt until the alpha crystal phase is obtained, and until the surface area of the quinacridone is at least 60 square meters per gram, separating the salt from the quinacridone with an aqueous medium, and recovering alpha crystal phase linear quinacridone pigment.

4. The process of claim 2 in which the inorganic salt is sodium chloride.

References Cited in the file of this patent

UNITED STATES PATENTS

| | | |
|---|---|---|
| 2,013,090 | Erskine et al. | Sept. 3, 1935 |
| 2,054,100 | Scott et al. | Sept. 15, 1936 |
| 2,378,283 | Bucher | June 12, 1945 |
| 2,402,167 | Lang | June 18, 1946 |
| 2,453,490 | Callaway et al. | Nov. 9, 1948 |
| 2,601,668 | Tullsen | June 24, 1952 |
| 2,687,410 | Hanke | Aug. 24, 1954 |

OTHER REFERENCES

Liebermann et al.: "Annalen," vol. 518, pp. 245–259 (1935).